W. E. HALE.
Hydraulic Elevator.
No. 224,901. Patented Feb. 24, 1880.
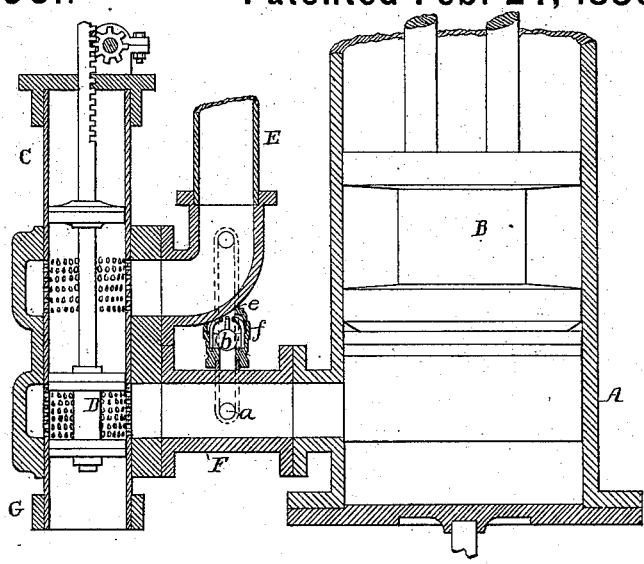
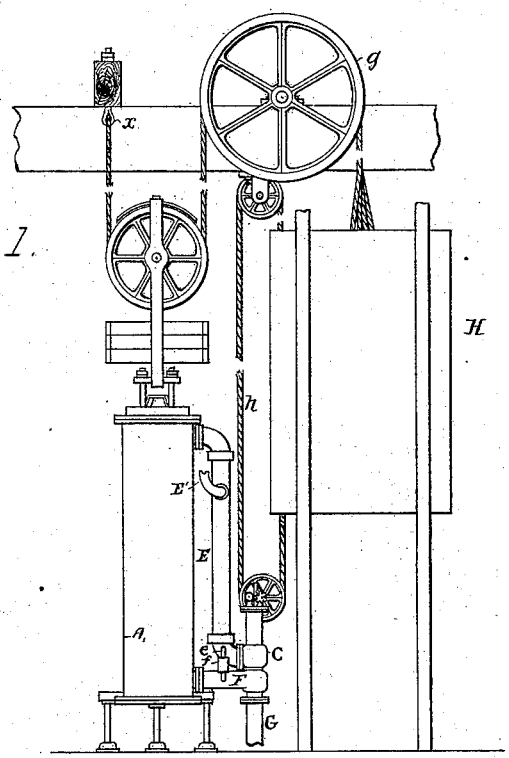
Attest:
Courtney A. Cooper
William Paxton
Inventor:
William E. Hale
By his attorney
Charles E. Foster

UNITED STATES PATENT OFFICE.

WILLIAM E. HALE, OF CHICAGO, ILLINOIS, ASSIGNOR TO HYDRAULIC ELEVATOR COMPANY.

HYDRAULIC ELEVATOR.

SPECIFICATION forming part of Letters Patent No. 224,901, dated February 24, 1880.

Application filed June 4, 1879.

*To all whom it may concern:*

Be it known that I, WILLIAM E. HALE, of Chicago, Cook county, State of Illinois, have invented an Improvement in Hydraulic Elevators, of which the following is a specification.

A source of considerable danger in hydraulic elevators of certain construction is the hammering of the water forward of the piston, resulting from the too sudden closing of the discharge or outlet, bringing the piston, while moving quickly, against an immovable body of water. The shock thus resulting strains and breaks the parts, injuring the apparatus and endangering the safety of the occupants of the cage. Attempts have been made to obviate this difficulty by using air-chambers to receive a portion of the water when the outlet is closed, so as to permit thereafter a slight movement of the piston. The compressed air, however, reacts against the piston, while the liability of air to escape from the chambers renders the device insecure and unreliable.

I prevent the too sudden arrest of the movement of the piston by providing a means of escape, under unusual pressure, for a portion of the water from the chamber or passages between the piston and discharge cock or outlet. For this purpose I employ a relief-valve, arranged as hereinafter described.

In the drawings, which form part of this specification, I have shown an arrangement adapted for use with what is known as the "Hale hydraulic elevator," Figure 1 being an external elevation of one of said elevators, and Fig. 2 a detached sectional view, enlarged, of part of the apparatus.

A is the cylinder; B, the piston; C, the valve-case; D, the valve, and E and F the circulating-pipes; E', the supply-pipe, and G the discharge-pipe, the special construction and operation of which, being well known, need not here be described.

The piston-rod carries a pulley, round which passes the elevating-rope, secured at one end, $x$, and extending over a pulley, $g$, and downward to the cage H.

The valve is operated by means of an endless rope, $h$, passing over a pulley on a shaft provided with a pinion that engages with a rack on the valve-stem. The space below the piston and that inclosed by the pipe F in this instance constitute the chamber in which the water is confined after the adjustment of the valve D to the position shown, so as to close the discharge-pipe G and pipe F and arrest the movement of the cage. In any part of the walls of this chamber I form an outlet-passage, $a$, to which I apply a valve, $b$, suitably loaded or weighted, so as to rise and permit the escape of a portion of the water from the chamber should the outlet be closed suddenly while the piston is moving quickly. I place the valve in a passage communicating with the chambers or pipes leading to the chambers on both sides of the piston.

The valve may be placed in a passage in the piston or in a tube, $e$, communicating with both the circulating-pipes E F, the valve-case $f$ and its valve $b$ being in the line of said tube, as shown, so that the pressure of the water from the supply side shall be upon the valve, and act to load it and keep it in position until the movement of the piston against the confined water at the other side forces a part of the water upward into and against the pressure in the supply-pipe. By this means I avoid the loss of water, and also dispense with the use of weights and springs, which are uncertain and liable to maladjustment.

It will be apparent that the escape of a portion of the water will permit the piston to descend until its momentum is overcome by the load of the valve, thus arresting the movement of the piston and of the car operated by the piston without the sudden shock and strains otherwise resulting, and permitting the discharge-valve to be closed in an instant without danger to the occupants of the cage.

A spring or weight may be used to load the valve $b$, and the water may be allowed to escape as waste.

I claim—

1. The combination, in a hydraulic elevator, of the cage-elevating apparatus, a pipe or pipes communicating with chambers at opposite sides of the piston, and a relief-valve arranged in said pipes to permit the escape of water and movement of the cage after the closing of the discharge-opening, substantially as set forth.

2. The combination, in a hydraulic apparatus, of a passage forming a communication between the chambers or pipes at opposite sides of the piston, and a valve arranged in said passage to permit the escape of water from the side toward which the piston is traveling when the discharge-outlet is closed, substantially as set forth.

In testimony whereof I have signed my name to this specification in the presence of two subscribing witnesses.

WILLIAM E. HALE.

Witnesses:
CHARLES E. FOSTER,
CHAS. R. OTIS.